Aug. 30, 1938.                M. BEREK                2,128,394
                             MICROSCOPE
                         Filed Aug. 27, 1937
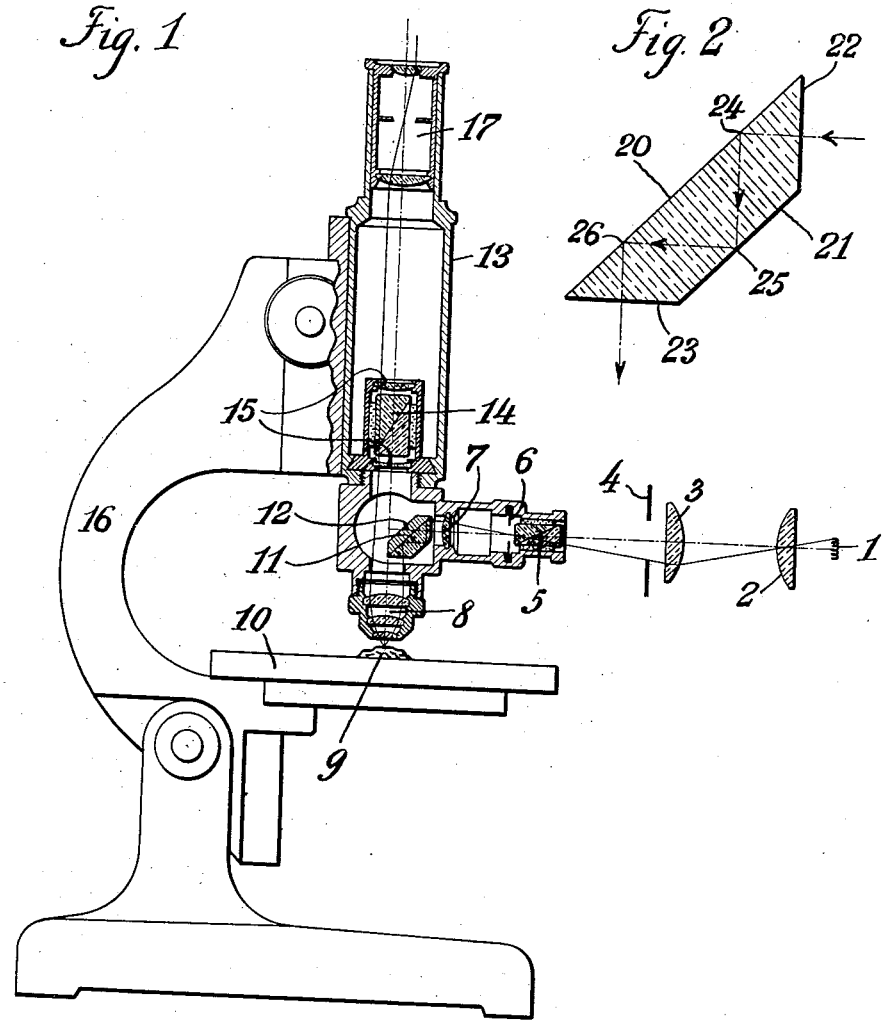
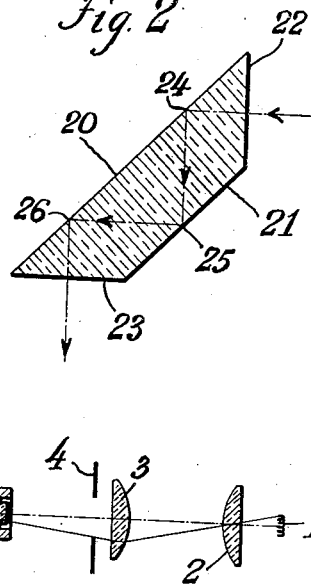
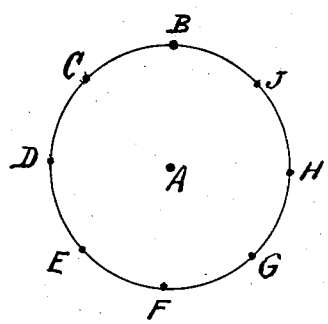
INVENTOR
Max Berek
BY
Ivan E. A. Koenigsberg
ATTORNEY Patented Aug. 30, 1938

2,128,394

UNITED STATES PATENT OFFICE 2,128,394

MICROSCOPE

Max Berek, Wetzlar, Germany, assignor to Ernst Leitz, G. m. b. H., Wetzlar, Germany Application August 27, 1937, Serial No. 161,207

3 Claims. (Cl. 88—40)

This invention relates to improvements in microscopes for determining and measuring the optical characteristics in opaque or nearly opaque light absorbing anisotropic substances by examining them in reflected polarized light. This application is a continuation in part of my pending application filed October 26, 1935; Serial Number 46,886 entitled a Device for rectangularly deflecting a polarized bundle of light rays.

The object of my invention is to provide a microscope including a system of prisms and lenses for making quantitative observations and measurements of the optical constants in opaque anisotropic substances in reflected polarized light and my invention is embodied in a microscope including prisms and lenses arranged and constructed as hereinafter set forth.

Observations of anisotropic transparent ores, minerals and crystals have been made under a polarizing microscope in transmitted light for determining not only qualitatively but also quantitatively their different optical characteristics and devices for carrying on such analysis are known.

An entirely different situation exists with respect to the examination of opaque anisotropic substances under a polarizing microscope in reflected light. In order to carry out such examination a special type of illuminator was necessarily used because the light must be directed toward the surface of the object without interfering with the observation thereof. Hence, illuminators, known in the art as vertical illuminators were constructed and used. An integral important part of such an illuminator is a member for deflecting the incoming light at ninety degrees in such a manner that the light passes through the objective of the microscope to the object and thence upwards to the eye of the observer. Ordinary total reflecting prisms were used for this purpose and were satisfactory so long as ordinary, not polarized, light was used. Later developments of the vertical illuminators included the use of a polarizer interposed between the light source and the illuminator. Such prior devices were useful for making qualitative observations only. They were, however, entirely useless for making correct quantitative measurements of the optical constants of opaque anisotropic substances. Such measurements are essential for the complete identification of such substances under investigation. It was believed that the qualitatively observed differences in the optical behavior of anisotropic substances in reflected polarized light were sufficient to establish the desired identification of the objects, but scientific analysis of the results of other investigators in this field of the optical art showed that a certain relationship between optical characteristics and crystallographic structure common to all the crystals observed in transmitted light could not be found when the same observations were conducted in reflected polarized light and that therefore the results of such observations could not be relied upon. These peculiarities led to investigations of the apparatus used in prior practices and it was found that the homogeneously linear polarized light beam used in prior examinations did not emerge from the reflecting prism without being subjected to serious disturbances so that the results observed and reported could not be relied upon as being accurate. These disturbances were found to be, first that the beam of light retained its linear polarized character only in the very center axis of the field of view observed in the microscope, whereas, on both sides thereof the light became elliptically polarized. Second, the main axes of vibrations on both sides of the center of the field of view became more and more inclined to the central axis of vibration.

Consequently the results of researches conducted with such prior equipment were necessarily faulty as may be seen from the following observations. For instance, it is well known that anisotropic transparent substances observed in transmitted polarized light between crossed nicols show, when the object stage is rotated, four positions of complete extinctions ninety degrees apart. But it was found that some anisotropic light absorbing substances observed in reflected polarized light by means of prior equipment such as referred to did not have their positions of extinction ninety degrees apart but at other different angles. Researches also showed that certain minerals, when placed in the exact center of the field of view, showed normal behavior, but as soon as they were slightly off center they showed different behavior depending upon their particular positions within the field of view and thus, of course, correct optical analysis became impossible.

Furthermore, the true linear character of the polarized light after deflection was maintained only in the center of the field of view and even this was true only so long as the plane of polarization of the incoming bundle of light rays was very accurately perpendicular to the plane of incidence of the reflecting prism. As soon as the plane of polarization of the incoming light deviated only by a very small amount, possibly only one degree or less, the linear character of the polarized light after reflection was no longer maintained in the center but in some other spot within the field of view. Hence it happened very easily that a microscopist who had made certain observations one day and used the same microscope for examining the same object the following day, by inadvertently making only a very slight error in the orientation of the polarizer, would arrive at entirely different results. Such slight errors were almost unavoidable because the mechanical means for the correct orientation of the polarizer were never sufficiently accurate and the optical criteria for ascertaining whether the linear character of the polarized light was correctly maintained were likewise not completely certain.

In order therefore, to be able to correctly determine and measure the anisotropic characteristics of opaque anisotropic substances under polarized reflected light it became necessary to devise some new instrumentality, researches having shown that the behaviors and characteristics of such substances heretofore attributed to the objects themselves, were incorrect and unreliable because of the inadequacy of the equipment used.

The object of this invention is the construction of a device, namely a prism to be used in a microscope, for deflecting polarized light at ninety degrees having the distinguishing characteristic that the incoming polarized light after having been reflected remains still completely linearly polarized and has the same direction of vibration over the entire field of view. In the accompanying drawing Fig. 1 is a side view of a microscope embodying the invention with parts in section and broken away and other parts being shown diagrammatically. Fig. 2 is a sectional view of the reflecting prism. Fig. 3 is a diagram illustrating certain phases of the invention.

Referring to Fig. 1, the numeral 1 indicates a source of light such as a filament lamp for instance. 2 and 3 are collecting lenses for converging the light rays before they enter the vertical illuminator. 4 is a diaphragm to eliminate scattered light from the course of the light rays. These parts are shown diagrammatically. In the illuminator there is mounted a polarizing prism 5, an iris diaphragm 6 and a lens 7. The latter not only renders the incoming light rays parallel but also, in conjunction with the objective 8 of the microscope forms an image of the iris diaphragm 6 in the plane of the object 9 upon the microscope stage 10.

The numeral 11 designates the trapezoid multiple reflecting prism according to this invention which, having a refractive index as hereinafter set forth, will reflect an incoming linear polarized light beam so that its linear character is retained throughout the field and its directions of vibrations remain parallel to each other within the field of view. The prism is suitably mounted upon a support 12. Within the microscope tube 13 is mounted an analyzer prism 14 between two anastigmatic correction lenses 15, 15. 16 designates the microscope stand for supporting the several parts and 17 is the usual microscope eyepiece.

The object, for instance an opaque anisotropic substance, is placed upon the stage. The polarized light, after having passed through the illuminator, strikes the prism 11 and is reflected downward through the objective 8 and upon the object which is then illuminated by a bundle of light rays circular in cross section, the size of the circle being governed by the size of the opening of the diaphragm 6. According to the nature of the surface of the object a greater or lesser portion of the rays which impinge upon the surface passes by reflection or diffraction back to the observing eye through the objective and eyepiece.

Referring now to the construction of the deflecting prism 11 the following observations are to be noted. As stated above, prior ordinary total deflecting prisms served their purpose satisfactorily so long as ordinary light was used. They were also used with vertical illuminators for qualitative observations in polarized reflected light, it being believed that such qualitative observations were sufficiently accurate for identification purposes. It has been shown that this belief was erroneous. It has further been shown that quantitative observations could not be made with such prior devices and until the present discovery and invention were made, nobody to my knowledge, knew how to construct a suitable prism for this purpose.

Researches showed that if a simple rightangled isosceles prism with a single total reflection at forty-five degrees on the hypotenuse is compared with a trapezoid prism having three total reflections, as shown in Fig. 2, the direction of the incident ray being at 90° to the entrance surface of the prism, both being made of the same glass of the refractive index of $n_D=1.516$ then it will be found that (with half of the angle of view being four degrees and the aperture being one degree) the deviation from the required homogeneous linear polarization amounts to five point eight degrees (5.8°) in the case of the simple rightangled isosceles total reflecting prism if the polarization plane of the polarizer is exactly perpendicular to the entrance face of the prism or trapezoid. It will also be found that the deviation of the polarized light from being truly linear in character or in other words its elliptical polarized condition amounts to within one twenty-eighth ($\frac{1}{28}$) measured by the proportions of the main axes of the polarization ellipses. These errors, however small they may appear to be, make it impossible under certain circumstances to use the observation for purposes of diagnosis.

The trapezoid prism is more unfavorable under the same conditions than that of the simple right angled prism, at least with respect to the deviation from the true lineation of polarization, because although the error in the azimuth is only one point seven degrees (1.7°), the error with respect to the lineation, i. e. the ellipticity of the polarization is greater, namely one twentieth ($\frac{1}{20}$). With errors of such magnitude, the polarization condition of the bundle of rays is insufficiently homogeneous and insufficiently linear for quantitative measurements and investigations, and a dependable analysis of the optical constants of the polished surfaces becomes impossible. The proportions become even materially more unfavorable if the polarizer deviates from the required orientation with respect to the main plane of incidence of the prism, even if it is only a fractional degree, because even though the polarizer is oriented most carefully such small errors are unavoidable. From this it will be seen that an ordinary trapezoid prism having an uneven number of total reflections cannot be used for the purposes of this invention.

Figure 2 illustrates a trapezoid glass prism for deflecting polarized light at an angle of ninety degrees. This prism is different from the ordinary trapezoid prism in that it is constructed in accordance with this invention and is characterized by that the incoming polarized light, after reflection, is still completely linear polarized with the same direction of vibrations prevailing within the entire field of view. This trapezoid prism has two parallel sides 20 and 21 of unequal length connected by the two sides 22 and 23 which are at right angles to each other. The incoming light rays are directed first against the side 20 from whence it is reflected at 24 against the opposite parallel side 21. From the side 21 the light is reflected at 25 towards the side 20. From here it is again reflected at 26 and passes out of the prism. The latter therefore has three total reflections and the normals to the reflecting surfaces have alternately opposed directions.

Totally reflected light undergoes a change in the condition of vibration by each total reflection. For instance, linearly polarized light becomes elliptically polarized. In order to practice this invention it is material that the light coming from the polarizer for all the rays of the bundle remains unchanged after having been reflected. According to this invention, this result is only possible if several total reflecting surfaces are utilized instead of only one total reflecting surface and that the refractive index of the glass, in which the total reflections occur, is suitable for the number of total reflections. As hereinafter shown, not all combinations of the refractive index and the number of total reflections will lead to the desired result, for all the rays of the bundle amount to an uneven multiple of $\pi$.

The relative refractive indices $n$ between the medium of incidence and the externally surrounding medium and the number $z$ of the total reflecting surfaces must fulfill the condition:

$$\frac{1}{\pi}\sum_{z}\left(\sqrt{6-\sqrt{12\frac{n^2+1}{n^2-1}}}\right)-p=1$$

In the equation $\Sigma$ represents the summation of the square root expression of $z$ reflecting surfaces, where $z$ is an uneven number, and $p$ represents an arbitrarily selected number from the even row of numbers 0, 2, 4, 6, etc. $\pi$ represents the known constant, namely 3.14159. If for instance only such solutions of the problem are considered in which $n$ has the same value for all $z$ surfaces, so that all the reflecting surfaces may be ground on the one glass body, then the value $n$ obtained from the above equation will be found to be $$n=\sqrt{\frac{a+1}{a-1}} \text{ in which } a=\frac{1}{12}\left\{\left[\frac{\pi}{z}(1+p)\right]^2-6\right\}^2$$

Accordingly, with five reflecting surfaces ($z=5$), a useable value for the refractive index is obtained only if $p=0$, namely $n=1.495$. With seven reflecting surfaces a useable value is obtained only if $p=0$, namely $n=1.453$. These values result, in the case of a parallel bundle of rays with an angle of incidence of 45° on each surface, in a condition of polarization which is non-elliptical and azimuthally correct. These values lead also to substantial improvements in the case of a non-parallel bundle of rays as compared with prior disclosures. Errors remain however, because the resulting phase difference after having passed the deflecting prism is not equal to $\pi$ for all rays of the bundle, but varies with the angle of incidence. The best solution is the one in which the value of $n$, for an approximate angle of incidence of 45°, shows the least possible variation in the phase difference when the angle of incidence is changed. This is true in the case of solutions in which the number of reflecting surfaces $z=6q+3$, where $q$ represents a number from the uneven row of numbers 0, 1, 2, 3, etc. All these cases lead to a refractive index of $n=\sqrt{3}$ and for these the phase difference is greatest for an angle of incidence of 45°. From these solutions of the problem the most favorable is the one which includes three reflecting surfaces, and it is immaterial whether the three reflecting surfaces are ground upon a single body or upon a plurality of glass bodies with perhaps different refractive indexes if only the value $n=\sqrt{3}=1.732$ be maintained accurately to within 5 per cent of the relative refractive index between the medium of incidence and the medium externally surrounding each of the total reflections. Experience has demonstrated that the critical limits of plus or minus five percent must be maintained or the desired results cannot be obtained.

The advantage of such a prism compared with a usual total reflecting prism is shown by the example illustrated in Fig. 3 in which the point A represents the main ray in a bundle of rays which are symmetrically disposed in a circle around A, the individual rays being represented at the points marked from B to J inclusive and in which the aperture (B, A) in the air is equal to 5 degrees. In such a case it will be found that the errors in polarization after a 90 degree deflection of the bundle of rays, if the polarizer has its plane of vibration at an angle of one degree towards the principal plane of incidence in the prism are:—

(a) In a simple total reflecting prism of glass having a refractive index of $n=1.516$:—

| For the rays | Azimuth errors | Ellipticity |
| --- | --- | --- |
| | Degrees | |
| A | +0.23 | +0.011 |
| B | +0.30 | +0.012 |
| C | -3.30 | +0.037 |
| D | -5.59 | +0.048 |
| E | -4.75 | +0.030 |
| F | +0.04 | +0.005 |
| G | +4.98 | -0.013 |
| H | +6.05 | -0.026 |
| J | +3.87 | -0.013 |

(b) In a prism of trapezoid cross section with three total reflecting surfaces in a glass body having a refractive index of $n=1.74$:—

| For the rays | Azimuth errors | Ellipticity |
| --- | --- | --- |
| | Degrees | |
| A | +0.00 | -0.001 |
| B | -0.00 | +0.000 |
| C | -0.04 | +0.000 |
| D | +0.00 | -0.002 |
| E | +0.04 | -0.000 |
| F | -0.00 | +0.001 |
| G | -0.04 | +0.000 |
| H | +0.08 | +0.001 |
| J | +0.04 | -0.000 |

Experience has demonstrated that the quantitative measurements are affected if the azimuth errors in the polarization amount to even as little as a fraction of a degree and if the ellipticity noticeably exceeds the proportion of 1: 1000.

A comparison of the two tables given shows to a person skilled in the art the great advantage of the invention. The prism has been shown as an element in a specific form of microscope. It will be understood of course that the construction of the prism and its use in examining opaque anisotropic substances in polarized reflected light is the main object of this invention and does not depend upon its use in a specific type of microscope.

I claim:—

1. A microscope for determining the optical constants of opaque anisotropic substances in polarized reflected light comprising an objective, an analyzing prism and an eye piece in optically operative relation with a common optical axis; a polarizing prism, means for supporting the same in the path of the incoming light rays with the optical axis of said prism at a right angle to the optical axis aforesaid, a deflecting prism interposed between said polarizing prism and the objective for deflecting at ninety degrees the light rays from the said polarizing prism to the said objective; said deflecting prism having a light entrance surface and a light emitting surface at ninety degrees to each other, the light entrance surface being at ninety degrees to the incoming rays, said deflecting prism having an uneven number of total reflecting surfaces, the relative refractive indices between the medium of incidence and the medium externally surrounding said total reflecting surfaces having a value of $n=\sqrt{3}=1.732$ to within five per cent thereof for the purpose of affecting a linear and azimuthal homogeneous correction of the polarization condition of the deflected light from the polarizing prism to the objective.

2. A microscope for determining the optical constants of opaque anisotropic substances in polarized reflected light comprising an objective, an analyzing prism and an eye piece in optically operative relation with a common optical axis; a polarizing prism, means for supporting the same in the path of the incoming light rays, a trapezoid prism interposed between said polarizing prism and the objective for deflecting at ninety degrees the light rays from said polarizing prism to the said objective; said trapezoid deflecting prism having a light entrance surface and a light emitting surface at ninety degrees to each other, the light entrance surface being at ninety degrees to the incoming rays, said trapezoid deflecting prism having three total deflecting surfaces for deflecting the incoming linear polarized light rays from the polarizing prism at ninety degrees to the objective, the refractive index of the said trapezoid deflecting prism being $n=\sqrt{3}=1.732$ to within five per cent thereof, the polarized light emerging from the said trapezoid deflecting prism without changes in the linear polarization thereof.

3. A microscope for determining the optical constants of opaque anisotropic substances in polarized reflected light comprising a microscope tube, an eye piece at the upper end thereof and an analyzing prism in the lower end thereof in optically operative relation with a common optical axis, a housing secured to the microscope tube below the analyzing prism therein and extending to one side of the microscope tube, an objective in said housing in optical alinement with the analyzing prism and the eye piece, a lens system in said housing having its optical axis perpendicular to the optical axis of the objective and consisting of a polarizing prism in the path of the incoming light rays and a trapezoid prism having three total reflecting surfaces for deflecting said incoming linear polarized light rays from the polarizing prism to the microscope objective, the said trapezoid deflecting prism having a light entrance surface at ninety degrees to the incoming rays from the polarizing prism and a light emitting surface at ninety degrees to the optical axis of the objective, the refractive index of the said trapezoid prism being $n=\sqrt{3}=1.732$ to within five per cent thereof, the polarized light emerging from the said trapezoid deflecting prism without changes in the linear polarization thereof.

MAX BEREK.

Certificate of Correction

Patent No. 2,128,394.　　　　　　　　　　　　　　August 30, 1938.

MAX BEREK

It is hereby certified that errors appear in the printed specification of the above numbered patent requiring correction as follows: Page 3, first column, line 15, after the word and period "directions." insert the sentence *In accordance with this invention the prism must comply with the data hereinafter set forth.*; and lines 31, 32, and 33, strike out the comma and words ", for all the rays of the bundle amount to an uneven multiple of $\pi$"; and that the said Letters Patent should be read with these corrections therein that the same may conform to the record of the case in the Patent Office.

Signed and sealed this 15th day of November, A. D. 1938.

[SEAL]　　　　　　　　　　　　　　　　　　　　Henry Van Arsdale
　　　　　　　　　　　　　　　　　　　　　　　　*Acting Commissioner of Patents.*